Nov. 5, 1940.   C. G. WOOD   2,220,564
CLUTCH
Filed March 17, 1938   2 Sheets-Sheet 1
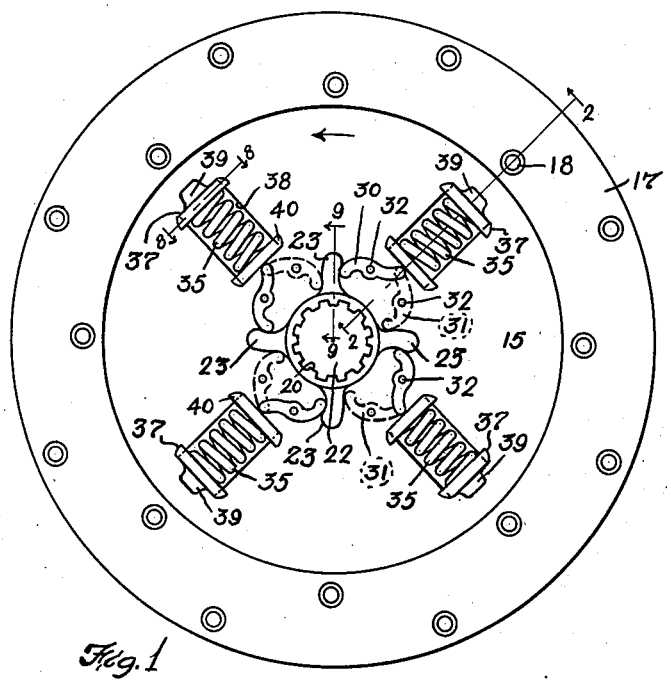
Fig. 1
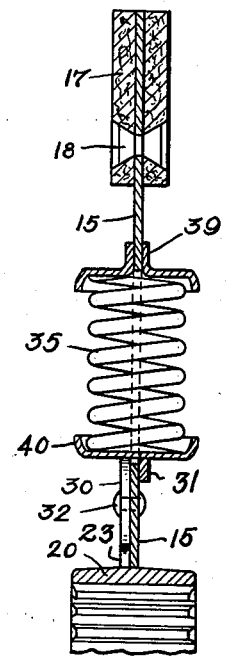
Fig. 2
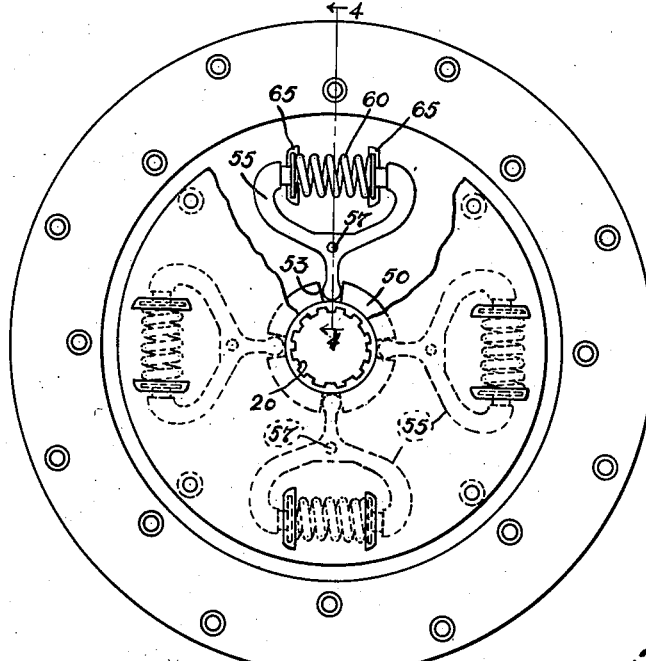
Fig. 3
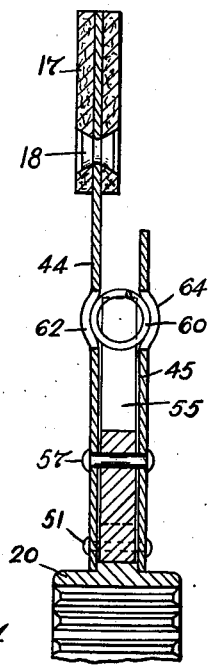
Fig. 4
INVENTOR.
Clarence G. Wood
BY
ATTORNEYS.

Nov. 5, 1940.   C. G. WOOD   2,220,564
CLUTCH
Filed March 17, 1938   2 Sheets-Sheet 2

INVENTOR.
Clarence G. Wood
BY
Fay, Oberlin & Fay
ATTORNEYS.

Patented Nov. 5, 1940

2,220,564

UNITED STATES PATENT OFFICE 2,220,564

CLUTCH

Clarence G. Wood, Cleveland, Ohio

Application March 17, 1938, Serial No. 196,378

1 Claim. (Cl. 192—68)

This invention relates to a friction clutch, and more particularly to one adapted for automotive use. Clutches for this service which must convey the rotative force of the motor of the rear axle assembly necessarily encounter considerable shock at the instant of engagement. If this shock is of a magnitude occasioned by instantaneous gripping of the clutch surfaces considerable strain is placed on the mechanical parts and the surfaces themselves very rapidly wear.

The chief object of my invention has been to provide a clutch wherein a lost-motion connection is provided, which becomes active at the instant of engagement of the clutch surface to permit a slight lag before the axle load is picked up by the motor. Such a lag need exist only for a very short period of time which in practice is equivalent to a very small rotative component.

An additional object of the invention has been to provide a linkage connecting two portions of the clutch together to cause the rotation as a unit and which linkage is resiliently positioned to maintain such rotation and yet be susceptible to the lost motion above set out.

Additional objects of the invention will become apparent from the following specification and appended drawings, while the novel features will be summarized in the claim.

In said annexed drawings—

Fig. 1 is a plan view of a clutch plate embodying my invention;

Fig. 2 is a section through Fig. 1, as indicated by the lines 2—2 thereon;

Figs. 3 and 5 are similar to Fig. 1, showing modifications of the invention;

Figure 5:
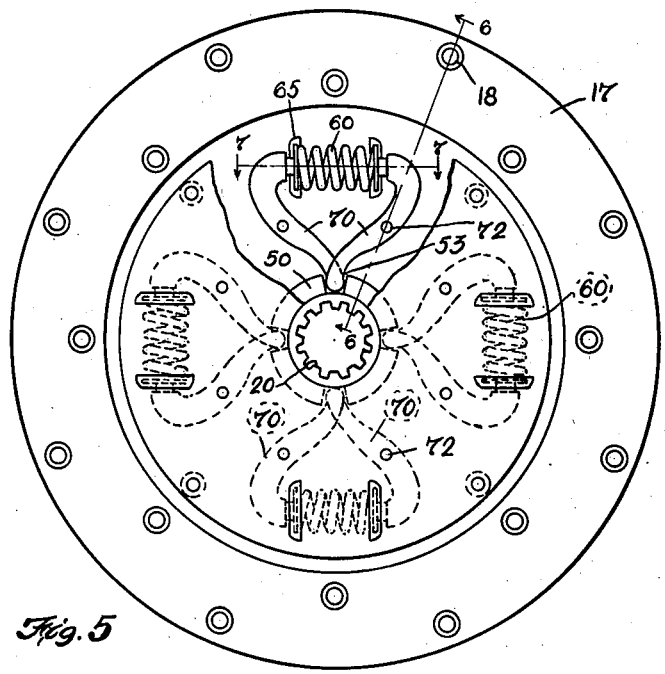
Figure 6:
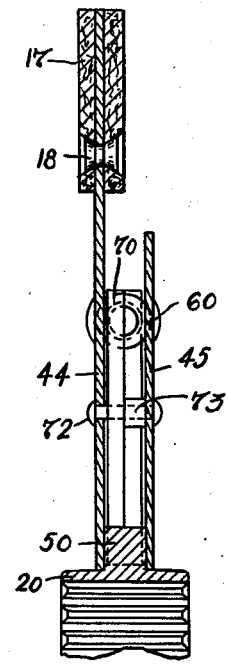
Figure 7:
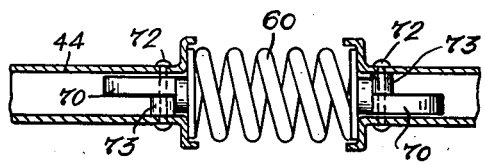

Figs. 4 and 6 are respectively sections therethrough as indicated by the lines 4—4 in Fig. 6 and 6—6 in Fig. 5;

Fig. 7 is a fragmentary detail as indicated by the line 7—7 in Fig. 5; and

Figure 8:
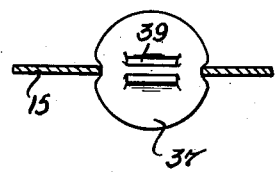
Figure 9:
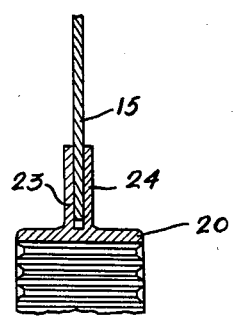

Figs. 8 and 9 are also fragmentary sections as indicated by the lines 8—8 and 9—9 respectively in Fig. 1.

Referring to the preferred form of invention shown in Figs. 1 and 2, I provide a flat plate 15, to the outer periphery of which is secured the annular clutch facing 17 by suitable rivets 18. A splined hub 20, slidably mounted on the driven shaft 22, is provided and is resiliently connected to the plate 15 as hereinafter described.

The lost-motion connection between the plate and the hub is provided by linkage which is resiliently secured in place. To this end, the hub is provided with fingers 23 and 24 projecting substantially radially therefrom and curved as shown in Fig. 1 to provide a sliding surface for engagement by the plate linkage. The fingers 23 and 24 engage the faces of the clutch plate 15 and hold the latter against axial movement relatively to the hub 20.

The lost-motion linkage includes pairs of pivoted arms 30 and 31 pivotally secured to the plate 15 at 32. All of the arms 30 are carried on one side of the plate and the adjacent arms 31 on the opposite side. The arms or fingers 30 are shaped to conform to the curved surfaces of the fingers 23 and to be free for sliding movement thereon. As shown in Fig. 1, the arm 30 is somewhat longer than the arm 31. This variation in size improves the lost-motion qualities of the connection due to the direction of rotation of the plate which, as shown in Fig. 1, is counter-clockwise.

The outer ends of the arms or fingers 30 and 31 lie in substantial registration with each other and are urged against the sliding surfaces of the respective spider fingers by strong compression springs 35. These springs, as shown in Fig. 8, are supported against the outer portion of the plate by cups 37, secured at the outer end of slots 38 and maintained in position by lips 39 overlying and pressed against the adjacent portions of the plate. The springs which lie within the slots 38 bear at the other end against cups 40 which are slidably retained in the spring slots 38. The cups in turn bear against the ends of the arms 30 and 31 which are in registration on opposite sides of the plate and effect the sliding contact with the fingers 23 and 24 aforementioned, which is also duplicated on each side of the plate.

From the preceding description it will be apparent that as the friction surfaces 17 pick up the load of the motor and commence rotation of the plate 15 the hub 20 will not commence rotation until the shock of the load has been absorbed by shifting of the arms 30 or 31 against the springs 35 and the fingers 23 and 24 which are integral with the hub. After the load has been picked up the linkages and springs adjust themselves and transmit the same without any further play or vibration.

The modifications shown in Figs. 3 and 5 are somewhat similar to each other in that the load absorbing springs are positioned annularly instead of radially of the plate. In either case the mechanism accomplishes a function identical with that set out in connection with Fig. 1. In these modifications the main clutch plate 44 is supplemented by plate 45 spaced axially therefrom. These two plates are mounted on a corresponding hub 20.

The hub 20 includes an outwardly projecting spider 50. The plates 44 and 45 are riveted together by rivets 51 which pass through the spider 50 to retain the plates and spider together against axial movement. The spider 50 is provided with four slots 53 equally spaced thereabout.

Fork members 55, carried between plates 44 and 45 at 57, are positioned with the body portion of the fork within respective slots 53 of the spider 50. The forks are rotatable clockwise or counter-clockwise about their pivots to permit absorption of shock transmitted between the clutch surfaces and the hub.

The pivotal movement of the forks is limited by strong compression springs 60 carried by the plates 44 and 45 in depressions 62 and 64 formed annularly therein. At each end the springs 60, acting through cups 65, bear against an arm of the forks 55. As the fork 55 is rocked in a clockwise direction, for instance Fig. 3, the right-hand end of the spring 60 is prevented from movement to the right by engagement between the cup 65 and the ends of the depressions 62 and 64. Thus, the spring tends to oppose the fork 55 as shown. If the fork 55 tends to shift in a counter-clockwise direction the left-hand end of the spring 60 will be similarly prevented from motion and the spring will act to oppose the said fork.

From the description above given it will be apparent that the plate assembly 44 and the hub 20 can shift annularly relative to each other, but will be repositioned due to the influence of the spring 60. In this manner the shock of engagement of the clutch is absorbed by the mechanism just described.

The modification of my invention shown in Figs. 5 and 6 is similar to the modification of Fig. 3 in that it employs plates 44 and 45, a spider 50 and spring 60.

In place of the single fork 55 I provide, however, a pair of arms or fingers 70 pivoted between the plates 44 and 45, as at 72. Due to the spacing between the plates 44 and 45 a spacing collar 73 is employed to maintain the respective fingers in position.

The ends of the arms or fingers 70 remote from the springs 60 lie within slots 53 of the spider 50. They coact with the springs and the slots to limit the motion between the plate assembly 44 and the hub 20 exactly as do the forked members 55 described in connection with Fig. 3.

From the foregoing description it will be apparent that I have provided an improved clutch plate construction in which simple link members or fingers, under the influence of springs, permit and yet limit relative rotative motion between the clutch plate facing and the splined hub connection to the driven shaft.

Other modes of applying the principle of my invention may be employed instead of the one explained, change being made as regards the structure herein disclosed, provided the means stated by any of the following claim or the equivalent of such stated means be employed.

I therefore particularly point out and distinctly claim as my invention:

A clutch construction of the character described comprising a central hub, a clutch plate mounted thereon and having a plurality of circumferentially spaced radially extending slots therein, springs mounted in said slots, cups slidably mounted in said slots and engaged by the radially inward ends of said slots, and interengaging fingers carried by said hub and plate respectively, said plate-carried fingers being yieldingly engaged at one end by said cups.

CLARENCE G. WOOD.